(12) United States Patent
Stich et al.

(10) Patent No.: US 11,069,129 B2
(45) Date of Patent: Jul. 20, 2021

(54) SHADER BINDING MANAGEMENT IN RAY TRACING

(71) Applicant: NVIDIA Corporation, San Jose, CA (US)

(72) Inventors: Martin Stich, Munich (DE); Ignacio Llamas, Palo Alto, CA (US); Steven Parker, Draper, UT (US)

(73) Assignee: NVIDIA Corporation, Santa Clara, CA (US)

( * ) Notice: Subject to any disclaimer, the term of this patent is extended or adjusted under 35 U.S.C. 154(b) by 18 days.

(21) Appl. No.: 16/376,943

(22) Filed: Apr. 5, 2019

(65) Prior Publication Data
US 2019/0311531 A1 Oct. 10, 2019

Related U.S. Application Data

(60) Provisional application No. 62/653,087, filed on Apr. 5, 2018.

(51) Int. Cl.
| | | |
|---|---|---|
| *G06T 15/83* | (2011.01) | |
| *G06F 9/54* | (2006.01) | |
| *G06T 15/00* | (2011.01) | |
| *G06T 15/06* | (2011.01) | |

(52) U.S. Cl.
CPC ............ *G06T 15/83* (2013.01); *G06F 9/54* (2013.01); *G06T 15/005* (2013.01); *G06T 15/06* (2013.01)

(58) Field of Classification Search
CPC ......... G06F 9/54; G06T 15/005; G06T 15/06; G06T 15/83
See application file for complete search history.

(56) References Cited

U.S. PATENT DOCUMENTS

| | | | | |
|---|---|---|---|---|
| 7,747,673 | B1* | 6/2010 | Simone, Jr. ........... | G06F 9/4494 709/201 |
| 9,519,947 | B2* | 12/2016 | Nickolls ................... | G06T 1/60 |
| 2009/0102844 | A1* | 4/2009 | Deparis ................... | G06T 15/50 345/426 |

(Continued)

OTHER PUBLICATIONS

OptiX™ Programming Guide, NVIDIA® GameWorks™ Documentation Rev. 1.0.180103, ©2014-2018, NVIDIA Corporation. https://docs.nvidia.com/gameworks/content/gameworkslibrary/optix/optix_programming_guide.htm.

(Continued)

*Primary Examiner* — Ming Wu
(74) *Attorney, Agent, or Firm* — Shook, Hardy & Bacon L.L.P.

(57) ABSTRACT

In various examples, shader bindings may be recorded in a shader binding table that includes shader records. Geometry of a 3D scene may be instantiated using object instances, and each may be associated with a respective set of the shader records using a location identifier of the set of shader records in memory. The set of shader records may represent shader bindings for an object instance under various predefined conditions. One or more of these predefined conditions may be implicit in the way the shader records are arranged in memory (e.g., indexed by ray type, by sub-geometry, etc.). For example, a section selector value (e.g., a section index) may be computed to locate and select a shader record based at least in part on a result of a ray tracing query (e.g., what sub-geometry was hit, what ray type was traced, etc.).

20 Claims, 11 Drawing Sheets

(56) References Cited

U.S. PATENT DOCUMENTS

| | | | | |
|---|---|---|---|---|
| 2014/0333623 A1* | 11/2014 | Ozdas | ................. | G06T 15/08 |
| | | | | 345/426 |
| 2016/0071230 A1* | 3/2016 | Patel | ..................... | G06F 9/54 |
| | | | | 345/520 |

OTHER PUBLICATIONS

NVIDIA® OptiX™ Ray Tracing Engine, ©2019, NVIDIA Corporation https://developer.nvidia.com/optix.

Root Signatures, Windows applications, Microsoft Docs. https://msdn.microsoft.com/en-us/library/windows/desktop/dn899208(v=vs.85).aspx.

OpenRL™ SDK—Ray Tracing's first Cross-Platform API, CAUSTIC Professional. http://imgtec.eetrend.com/sites/imgtec.eetrend.com/files/article/201402/1495-2162-1.pdf.

Intel® Embree, High Performance Ray Tracing Kernels https://www.embree.org/.

"Array data structure", Wikipedia, pp. 14 (Mar. 27, 2018).

Subtil, N., et al.,"NVIDIA RTX: Enabling Ray Tracing in Vulkan", Mar. 27, 2018, XP055587839, Retrieved from the Internet: URL:http://ondemand.gputechconf.com/gtc/2018/presentation/s8521-advanced-graphics-extensions-for-vulkan.pdf.

International Preliminary Report on Patentability received for PCT Application No. PCT/US2019/026134, dated Oct. 15, 2020, 10 pages.

\* cited by examiner

SHADER BINDING MANAGEMENT IN RAY TRACING

CROSS-REFERENCE TO RELATED APPLICATIONS

This application claims the benefit of U.S. Provisional Application No. 62/653,087, filed on Apr. 5, 2018, which is hereby incorporated by reference in its entirety.

BACKGROUND

Ray tracing may be used to render images by tracing a path of light in a three-dimensional (3D) scene and simulating the effects of the light's interactions with objects in the scene. To do so, a conventional system may execute shaders, which are computer-implemented programs used for shading or otherwise computing rendering effects (e.g., to determine a pixel color). Shader bindings may be used to specify a shader to run and what resources (e.g., variables) are available to the shader under predefined conditions. For example, a ray tracing query may be used to determine whether a ray intersects with the geometry in the 3D scene and a particular shader may be executed with associated resources based on the shader binding associated with the result of the query (e.g., when the ray missed all geometry, hits particular geometry, etc.).

A conventional system may use an Application Programming Interface (API) that allows an application to define the shader bindings for rendering a 3D scene using dedicated API functions. The shader bindings are recorded by the API in an internal hierarchical tree-based data structure that is managed by the API without being directly accessible to the application. The data structure records the relationships and bindings between scene elements, shaders, and resources using sub-data structures and pointers to other sub-data structures. In order to identify a shader to execute, the system may use a pointer chasing mechanism in which a series of pointers are identified and followed to traverse the tree-based data structure. As a result, significant computational overhead may be introduced when recording, updating, and identifying shader bindings. This may be compounded by the structure of the API constraining the use of application-specific knowledge to influence how and when computing resources are used to manage the data structure (e.g., scheduling, etc.), which may result in visible stutter during rendering. Also, the application may require many calls into the API to communicate changes to shader bindings, which can become a performance bottleneck in some situations.

SUMMARY

Embodiments of the present disclosure relate to shader binding management in ray tracing. In particular, the present disclosure relates to shader bindings used to render images using ray tracing. More specifically, the current disclosure relates to approaches for managing shader bindings and for structuring the relationship between APIs and applications in managing data structures used to record the shader bindings.

Disclosed approaches provide for data structures that store shader binding records used to render 3D scenes in a manner that reduces the computational overhead required for maintaining the shader bindings and for identifying which shaders to execute to render the 3D scenes using ray tracing. The shader bindings may be recorded in a shader binding table that includes shader records, each identifying one or more shaders and resources to use with the shader(s). The geometry of a 3D scene may be instantiated using object instances, and each may be associated with a respective set of the shader records using a location identifier of the set of shader records in memory, such as an offset value relative to a location of the shader binding table (e.g., an index) or other pointer. The set of shader records may represent shader bindings for an object instance under various predefined conditions. One or more of these predefined conditions may be implicit in the way the shader records are arranged in memory (e.g., indexed by ray type, by sub-geometry, etc.). This allows for the arrangement to be leveraged to compute the location of the proper shader record relative to the location of the set of records (e.g., the offset value) without pointer chasing to another data structure. For example, a section selector value (e.g., a section index) may be computed to locate a shader record based at least in part on a result of a query (e.g., what sub-geometry was hit, what ray type was traced, etc.). This computation may leverage a stride of the sections, a stride between sections and/or other predefined arrangement criteria for the set of shader records. A similar approach may be used for other types of shader bindings, such as ray gen shader bindings and miss shader bindings.

In some examples, an application may be responsible for storing and updating the shader binding table (and object instances in some examples) in memory, allowing the application to directly control how and when computing resources are used to manage the data structure (e.g., scheduling, etc.), which may improve rendering performance. Further, in embodiments where an API is used to evaluate ray tracing queries and execute corresponding shaders using the shader binding table, the API may be able to identify the proper shader record efficiently using a limited set of information provided by the application (e.g., pointers to the shader binding table, object instances, a set of ray gen shader records, a set of miss shader records, etc.).

BRIEF DESCRIPTION OF THE DRAWINGS

The present systems and methods for shader binding management in ray tracing is described in detail below with reference to the attached drawing figures, wherein.

DETAILED DESCRIPTION

Figure 1:
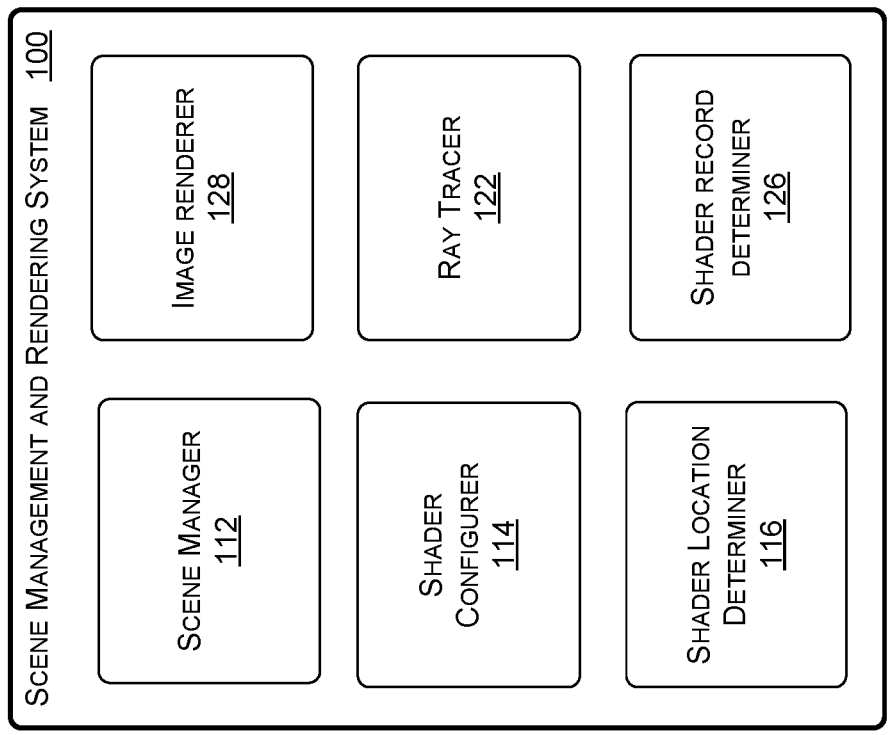
FIG. 1 is an example system diagram of a scene management and rendering system, in accordance with some embodiments of the present disclosure.

The present disclosure relates to shader binding management in ray tracing. In particular, the present disclosure relates to approaches for managing shader bindings used to render images using ray tracing. More specifically, the current disclosure relates to approaches for recording shader bindings and for structuring the relationship between APIs and applications in managing data structures used to record the shader bindings.

In a conventional system, shader bindings for a 3D scene are stored and updated by an API that evaluates ray tracing queries and identifies and executes shaders based on those queries to render the 3D scene. An internal hierarchical tree-based data structure records the shader bindings and is managed by the API without being directly accessible to the application. To identify a shader to execute at run-time, the API may use a pointer chasing mechanism in which a series of pointers are identified and followed to traverse the tree-based data structure. As a result, significant computational overhead may be introduced when recording, updating, and identifying shader bindings. For example, various data structures of different sizes may be sequentially accessed and analyzed across memory to identify what shaders and resources to use or to update associated shader bindings.

The computational overhead may be compounded by the structure of the API constraining the use of application-specific knowledge to influence how and when computing resources are used to manage the data structure (e.g., scheduling, etc.), which may result in visible stutter during rendering. For example, an application may be unable to single-, double- or triple-buffer data used to store or update shader bindings, or schedule memory copy and synchronization operations at specific times. This may be particularly impactful in the context of GPUs, as the data may often have to be transferred to GPU memory (e.g., from system memory) where it may undergo a format conversion and be synchronized carefully with ray tracing queries and other work for efficient execution.

Also, the application may require many calls into the API to communicate changes to shader bindings, which can become a performance bottleneck in some situations. For example, the API may expose a material object to allow the application to define the shader bindings for when a ray intersects with particular geometry in a 3D scene. To do so, the application may use dedicated API functions to set the shader to the material object and to associate the resources with the shader for the material object. Another dedicated API function may be used to associate the material object to a geometry instance that represents the particular geometry. Other API functions may be used to define what shader to run when the ray misses all geometry, is part of a ray generation query, and/or is for a particular ray type.

In contrast to conventional approaches, disclosed approaches may record shader bindings in a shader binding table that includes shader records, each identifying one or more shaders and resources to use with the shader(s). Geometry of a 3D scene may be instantiated using object instances, and each may be associated with a respective set of the shader records using a location identifier of the set of shader records (as used herein a set may include one or more elements) in memory, such as an offset value relative to a location of the shader binding table (e.g., an index) or other pointer. The set of shader records may represent shader bindings for an object instance under various predefined conditions. For example, the set of shader records may account for different shaders to be executed when a ray hits a surface of an object instance depending on what sub-geometry was hit, the ray type of the ray (e.g., a shadow ray or a radiance ray), a face of the geometry and/or sub-geometry that was hit (e.g., a particular triangle), and/or other criteria associated with a ray tracing query.

One or more of these predefined conditions may be implicit in the way the shader records are arranged or organized in memory (e.g., indexed by ray type, by sub-geometry, etc.). This may allow for the arrangement to be leveraged to compute the location of the proper shader record relative to the location of the set of records (e.g., the offset value) without pointer chasing to another data structure. For example, a section selector value (e.g., a section index) may be computed to locate a shader record based at least in part on a result of a query (e.g., what sub-geometry was hit, what ray type was traced, whether any geometry was hit, etc.). This computation may leverage a stride of the sections, a stride between sections, a fixed size of at least some of the records, and/or other predefined arrangement criteria for the set of shader records. This may simplify the calculation of where a shader record is located under any number of predefined conditions, such as for a particular sub-geometry or ray type. As a result, significant computational overhead may be saved when recording, updating, and identifying shader bindings relative to conventional approaches.

For example, where the set of shader records are indexed by sub-geometry, a section selector value may be computed that locates the section of the shader records that corresponds to a particular sub-geometry hit by a ray. Where the section includes a single shader record, the section selector value may locate the shader record thereby avoiding traversal of multiple data structures. Where the section includes multiple shader records to account for additional criteria, the section may be similarly indexed by the additional criteria (e.g., ray type in this example). The location the particular shader record may then be computed relative to the section based at least in part on the additional criteria (e.g., looking up the index of the shader record that corresponds to the ray type of the ray in the above example). In some examples, any number of sections may be nested within another section. Also in some examples, sections for different sets of shader records (e.g., different object instances) may be interleaved to provide additional flexibility in arranging shader records. Similar approaches may be used for other types of shader bindings, such as ray gen shader bindings and miss shader bindings.

In some examples, an application may be responsible for storing and updating the shader binding table (and object instances in some examples) in memory, allowing the application to directly control how and when computing resources are used to manage the data structure (e.g., scheduling, etc.), which may improve rendering performance relative to conventional approaches. For example, an application may be able to single-, double- or triple-buffer data used to store or update shader bindings, or schedule memory copy and synchronization operations at specific times. As an example, an application may be able to concurrently maintain multiple sets of the shader binding table (and/or object instances) in memory (e.g., GPU memory). The application may then switch between which table is active (and/or which object instances are active) by updating an active shader binding table value (e.g., used to compute locations of shader records) to point to the active shader binding table (or object instance pointers for object instances). In further examples, the application may configure shader records (and/or object instances) in a first memory (e.g., system memory and/or a hard drive) used to buffer shader records (and/or object instances) and copy over any of the various data to a second memory (e.g., GPU memory) that includes the active data used to render a 3D scene (e.g., into the active shader binding table or otherwise).

Disclosed approaches to shader binding management may be used in combination with an API that evaluates ray tracing queries and identifies and executes shaders based on those queries to render the 3D scene (e.g., using a GPU). In other examples, an application may evaluate ray tracing queries and identify and execute shaders based on those queries to render a 3D scene (e.g., using a CPU). Other potential combinations of functionality between applications and APIs are contemplated as being within the scope of the present disclosure. In embodiments where an API is used to evaluate ray tracing queries and execute corresponding shaders using the shader binding table, the API may be able to identify the proper shader record efficiently using a limited set of information provided by the application. For example, to identify a shader record for an object instance based on a ray tracing query, the application may provide a pointer to a shader binding table in memory, an offset, or index, that is relative to the location of the shader binding table and is stored in the object instance, and one or more constants that represent the structure of the shader binding table and/or set of records. For example, the one or more constants may represent the stride between sections and/or of each section (e.g., of a particular type), such as the number of records in the section. The remaining information used to compute the location of a particular shader record may be derived from the ray tracing query (e.g., ray type, hit, miss, sub-geometry, etc.). While ray tracing queries are primarily described herein, the use of the term may more generally relate to ray tracing functions and/or API calls.

With reference to FIG. 1, FIG. 1 is an example system diagram of a scene management and rendering system 100, which may be used to render 3D scenes using ray tracing techniques, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. By way of example, the scene management and rendering system 100 may be implemented on one or more instances of the computing device 800 of FIG. 8.

The scene management and rendering system 100 may include, among other things, a scene manager 112, a shader configurer 114, a shader location determiner 116, an image renderer 128, a ray tracer 122, and a shader record determiner 126. The scene manager 112 may be configured to set up, control, and manage a 3D scene, such as scene elements of the 3D scene (e.g., meshes, objects, and the like), shaders used to render the 3D scene, and resources used by the shaders to render the 3D scene. To do so, the scene manager 112 may manage the relationships and bindings between the scene elements, the shaders, and the resources using one or more shader binding tables, such as a shader binding table 200 of FIG. 2A. This may include using the shader location determiner 116 to determine the locations for particular shader records of the shader binding table in memory (e.g., according to a defined arrangement criteria). This may further include using the shader configurer 114 to write or update the shader records at the locations identified using the shader location determiner 116. The scene manager 112 may also orchestrate the rendering of the 3D scene by issuing ray tracing queries and/or other ray tracing functions which may trigger one or more shaders. In some examples, the scene manager 112 is implemented as one or more applications or shaders.

The image renderer 128 may be configured to render one or more portions of the 3D scene using ray tracing techniques, such as to determine colors of pixel values (e.g., for one or more images) based at least in part on the configuration of the 3D scene and orchestration of the rendering by the scene manager 112. This may include identifying shaders and associated resources using the shader binding table(s) to implement ray tracing techniques. For example, the image renderer 128 may render the 3D scene using the ray tracer 122 and shader record determiner 126. The ray tracer 122 may be configured to trace ray(s) in the 3D scene, such as to test for intersections of the ray(s) with geometry in the 3D scene (e.g., in response to ray tracing queries and/or ray tracing function calls). The shader record determiner 126 may be configured to determine which shader(s) to execute and which resources to use for the shader(s) by computing the location(s) of a corresponding shader record(s) in memory. In some examples, the image renderer 128 is implemented as an API.

Figure 2A:
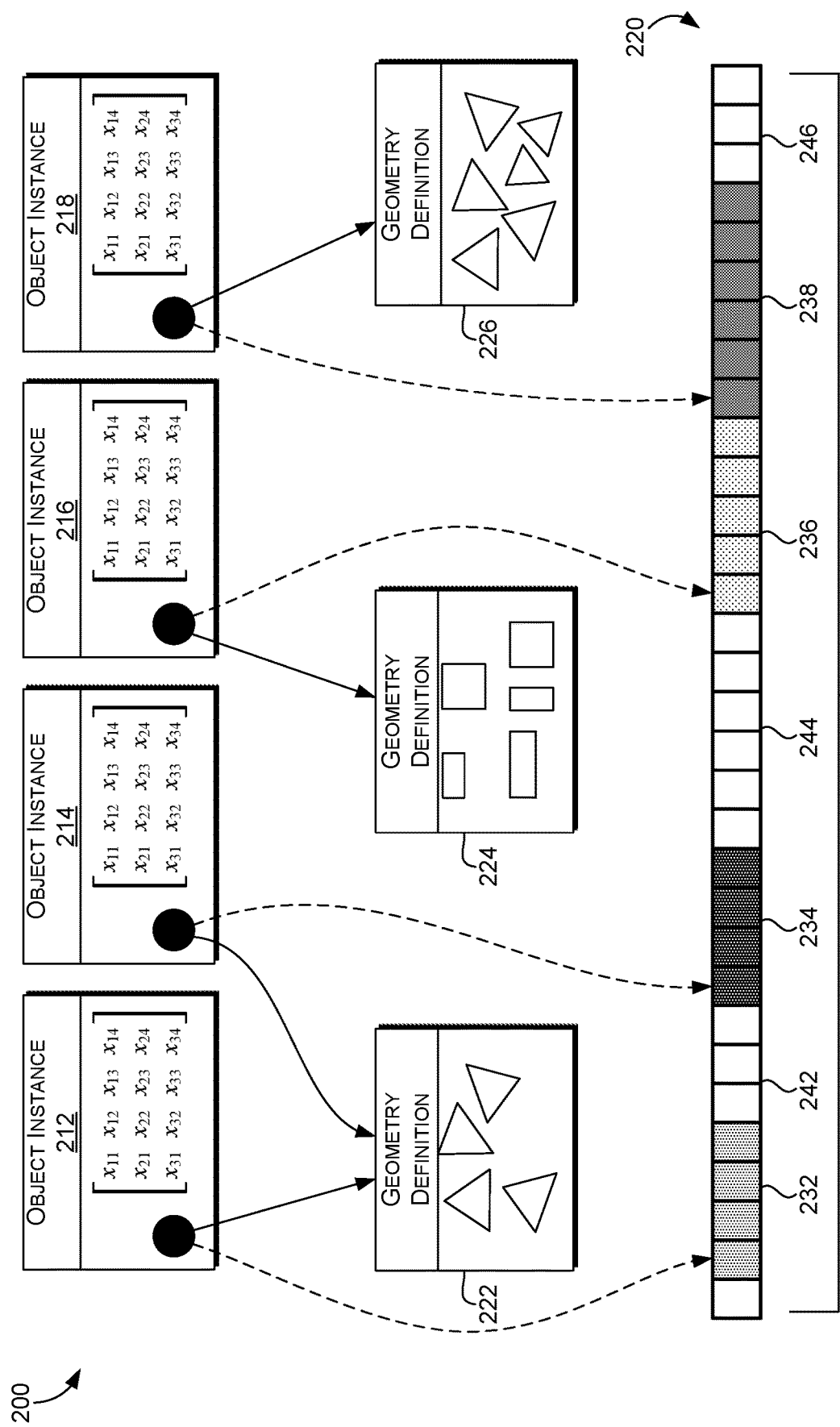
FIG. 2A is a diagram illustrating an example of a relationship between a shader binding table and scene elements, in accordance with some embodiments of the present disclosure.

As mentioned, the scene manager 112 may be configured to set up, control, and manage a 3D scene, such as scene elements of the 3D scene (e.g., meshes, objects, and the like), shaders used to render the 3D scene, and resources used by the shaders to render the 3D scene. Referring now to FIG. 2A with FIG. 1, FIG. 2A is a diagram illustrating an example of a relationship between the shader binding table 200 and scene elements, in accordance with some embodiments of the present disclosure. The scene manager 112 may represent a scene object of a 3D scene as an object instance, and may define each object instance for the 3D scene, such as object instances 212, 214, 216, and 218 (212-218) of FIG. 2A. This may be accomplished by storing a corresponding object instance record in memory 220. Each object instance may include a pointer to a geometry definition, a transform matrix, and a location identifier (which may also be referred to as an offset value or index value) of a set of records in the shader binding table 230 that are associated with the object instance in the memory 220 (e.g., a pointer to the set of records). For example, the object instance 212 is shown as including a transform matrix, a pointer to a geometry definition 222, and a location identifier of a set of shader records 232. Each of the sets of shader records 232, 234, 236, and 238 (232-238) may be similarly associated with a corresponding object instance(s). Records 242, 244, and 246 may refer to unused memory locations or locations not used for shader records.

The scene manager 112 may manage and control the relationships between a shader binding table, object instance(s), and geometry definition(s) associated with a 3D scene. The scene manager 112 may also define the geometry definition(s), such as geometry definitions 222, 224, and 226 (222-226) of FIG. 2A, in the 3D scene. The geometry definition(s) may include mesh data for individual geometries in the 3D scene. The scene manager 112 may define each object instance in the 3D scene to include a pointer to one of the geometry definition(s) along with a transformation matrix defining the transformation of the geometries in object instance in relation to the associated geometry definition. Using this approach, different 3D objects may use the same geometry definition, but be rendered in a different manner due to different transform matrices. In various examples, the object instance(s) may each be defined to include one or more sub-geometries. The scene manager 112 may assign one or more shaders to each object instance, or to each sub-geometry of the object instance. The scene manager 112 may also define what shaders are included in the set of records (e.g., the set of shader records 232) associated with each object instance in the 3D scene and may use the shader configurer 114 and the shader location determiner 116 to form those associations relative to a location represented by the location identifier for the set of records (e.g., by leveraging predefined arrangement criteria for the shader records). For example, the set of records may represent the potential shaders that the image renderer 128 may execute (and associated resources to use) when a ray intersects with the object instance during 3D scene rendering, depending on criteria associated with the intersection.

Figure 2B:
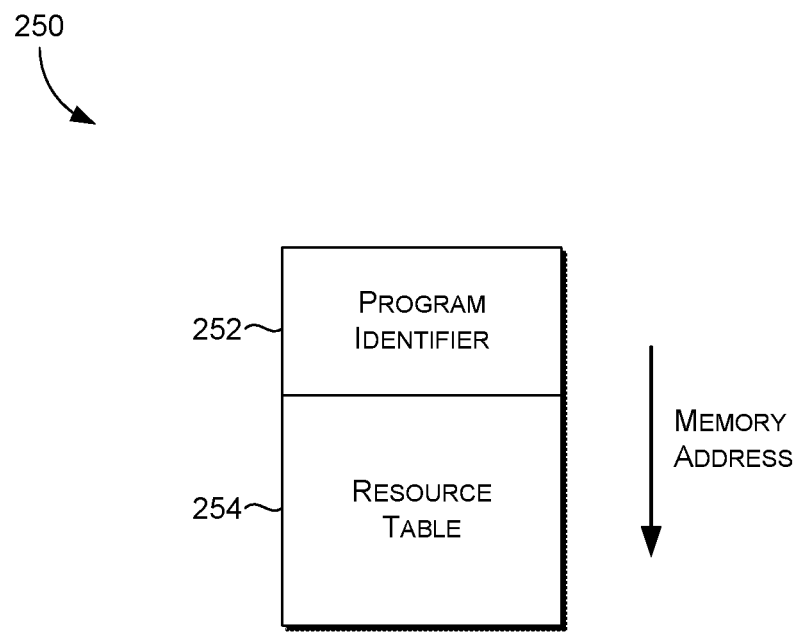
FIG. 2B is a diagram illustrating an example of a shader record, which may be used in a shader binding table, in accordance with some embodiments of the present disclosure.

FIG. 2B is a diagram illustrating an example of a shader record 250, which may be used in the shader binding table 230, in accordance with some embodiments of the present disclosure. The scene manager 112 may employ the shader configurer 114 to write or update shader record(s)—such as the shader record 250 of FIG. 2B—to associate a shader(s) and associated resources with object instance(s) of the 3D scene. The shader configurer 114 may configure a shader record to include a program identifier, such as program identifier 252 of the shader record 250 of FIG. 2B, and a resource table, such as a resource table 254 of the shader record 250 of FIG. 2B. The program identifier may identify one or more particular shaders to execute. The resource table may identify and/or include resources that are to be used as a set of input parameters to the shaders identified by the shader record. A resource table may include, as examples, one or more constants, pointers to constant buffers, pointers to textures, materials or other resources, or pointers to table(s) of pointers. For example, when the image renderer 128 uses the shader record determiner 126 to identify a location of a particular shader record, the image renderer 128 may use the program identifier to identify what shader(s) to execute, and may use the resource table to identify what resources the shader(s) may use when executing.

The shader configurer 114 may be used by the scene manager 112 to determine the location identifier for a set of object records (e.g., the set of shader records 232) in a shader binding table, such as the shader binding table 230 of FIGS. 2A and 3A-3C. The location identifier may be a pointer to a location for the set of object records in the memory 220, such as to a start of the first shader record for the set of shader records (or other predefined location). In some example, the location identifier may represent, identify, or be an offset value to the location of the set of object records that is relative to a location of the shader binding table 230 in the memory 220. For example, the offset value may define a memory address that is relative to a start or end of the shader binding table 230 in the memory 220. In some examples, an offset value may be an index value. For example, the shader binding table 230 may be indexed by shader record, object instance, and/or or other criteria. The memory address may then be computed or otherwise derived from the index value. As another option, the offset value may be a memory address distance to the memory address. As a further option, the memory address may be used as the location identifier.

The shader configurer 114 computes or defines a the location identifier for a set of shader records such that it points to the location of the associated set of shader records in the memory 220. For example, an offset value for a set of shader records may be computed or otherwise determined based at least in part on the location of the set of shader records relative to the location of the shader binding table 230. A location identifier, such as an index value, may be stored for each object instance in the 3D scene, such as the object instances 212-218 of FIG. 2A. Location identifiers may similarly be employed with other sets of shader records which may not necessarily be associated with object instances (e.g., used for miss shaders or ray gen shaders).

In some examples, the shader location determiner 116 may use the location identifier of a set of records (e.g., for an object instance) to compute the location for a shader record(s) in the set of shader records in the memory 220. For example, as described herein, the shader location determiner 116 may compute the location for a particular shader record(s) relative to the location identified by the location identifier. Once identified, the shader configurer 114 may be used to record or modify one or more portions of the shader record, such as the program identifier and/or the resource table.

For example, to locate shader records in a shader binding table, such as the shader binding table 230 of FIGS. 2A and 3A-3C, the shader location determiner 116 may determine the offset value for the set of records (e.g., the index value) which may define a starting (or first) location in memory for a set of shader records in the shader binding table. The shader location determiner 116 may also be configured to compute the location in the memory of a particular shader record(s) of the set of shader records using the offset value and arrangement criteria for the set of records in the shader binding table that may be associated with a ray tracing query and/or function. Examples of the arrangement criteria include those defined by a potential result of a ray tracing query and/or parameters of a ray tracing query. For example, arrangement criteria for the potential result of a ray tracing query may include whether a ray hit (e.g., intersected with) or missed geometry the 3D scene, what object instance and/or sub-geometry was hit, and/or what ray type hit or missed the geometry of the 3D scene. The arrangement criteria may be used with the offset value by the shader location determiner 116 to compute the location of the particular shader record(s) relative to the location of the start (or other location) of the set of shader records. For example, the arrangement criteria may define a section selector value that locates a section that includes the particular shader record(s) in the set of shader records. The section may correspond to the one or more of the arrangement criteria. By accounting for the various arrangement criteria, the shader location determiner 116 may be used to identify the appropriate locations for shader records in order to implicitly capture shader bindings in the way the shader records are arranged in memory under various predefined conditions. Thus, the image renderer 128 may later leverage the predefined arrangement criteria to more efficiently compute the location(s) of particular shader records for a ray tracing query according to one or more of the criteria that are satisfied by the ray tracing query.

As mentioned, the image renderer 128 may be configured to render one or more portions of a 3D scene using ray tracing techniques, such as to determine colors of pixel values (e.g., for one or more images) based at least in part on the configuration of the 3D scene and orchestration of rendering by the scene manager 112. For example, to determine a color of one or more pixels, the image renderer 128 may cast a ray(s) and determine when the ray(s) intersects with geometry in the 3D scene. One or more applicable shader(s) may be executed based on the determination as defined by the shader bindings captured in a shader binding table, such as the shader binding table 230. The image renderer 128 may employ the ray tracer 122 to process ray tracing queries or functions, which may involve tracing rays and determining results of the ray tracing queries or functions. In this regard, the shader record determiner 126 may use the criteria associated with the ray tracing queries or functions to determine which shader(s) to execute and which resources to use for the shader(s) by computing the location(s) of a corresponding shader record(s) in memory.

The ray tracer 122 may provide the ray tracing information or criteria used by the shader record determiner 126 to identify the appropriate shader(s) and associated resources. For example, where a ray tracing query involves a ray tracing dispatch, the criteria may result in the shader record determiner 126 invoking a ray generation shader. A ray generation query may refer to a ray tracing query that performs a ray tracing dispatch which in turn may invoke other shader operations. Where a ray tracing query finds an intersection between a ray and the 3D scene, the criteria may result in the shader record determiner 126 invoking a hit shader or intersection shader. The particular hit shader that is invoked may further depend on one or more other criteria, such as the ray type (e.g., a shadow ray or radiance ray), what particular sub-geometry of a 3D object was hit, and/or what face of the geometry of the 3D object was hit. Further, where a ray tracing query has completed a search for ray-scene intersections, the criteria may result in the shader record determiner 126 invoking a closest hit or miss shader. The particular miss shader that is invoked may also depend on one or more other criteria, such as the ray type (e.g., a shadow ray or radiance ray). These are provided as non-limiting examples and many different arrangements are possible.

Using the criteria determined by the ray tracer 122 for a ray tracing query, the shader record determiner 126 may be configured to compute a location in the memory 220 of a shader record that defines the one or more shaders and associated resources to execute to render the 3D scene. For example, where the criteria identifies the object instance 212 (e.g., based on a ray intersecting with geometry of the object instance 212), the shader record determiner 126 may determine the location identifier of the set of shader records 232 of the object instance 212 from the object instance record. The shader record determiner 126 may then use the location identifier and the other criteria to compute the location of the shader record.

In operation, the shader record determiner 126 may compute the location for the shader record similar to the shader location determiner 116. For example, the shader record determiner 126 may determine the offset value for the set of shader records 232 (e.g., the index value) using the location identifier. The shader record determiner 126 may also compute the location in the memory of the shader record(s) of the set of shader records 232 using the offset value and the criteria, which may include one or more of the predefined arrangement criteria used by the shader location determiner 116 to define the arrangement of the shader records in the shader binding table 230. As mentioned, examples of the criteria include those defined by a potential result of a ray tracing query and/or parameters of a ray tracing query. For example, the criteria for the potential result of a ray tracing query may include whether a ray hit (e.g., intersected with) or missed geometry the 3D scene, what object instance and/or sub-geometry was hit, and/or what ray type hit or missed the geometry of the 3D scene. The criteria may be used with the offset value by the shader record determiner 126 to compute the location of the particular shader record(s) relative to the location of the start (or other location) of the set of shader records 232. For example, the criteria may define a section selector value that locates a section that includes the particular shader record(s) in the set of shader records. The section may correspond to the one or more of the criteria. By accounting for the various criteria, the shader record determiner 126 may leverage the way the shader records are arranged in memory to implicitly capture shader bindings under various predefined conditions. Thus, the image renderer 128 may leverage the predefined arrangement criteria to more efficiently compute the location(s) of particular shader records for a ray tracing query according to one or more of the criteria that are satisfied by the ray tracing query.

Figure 3A:
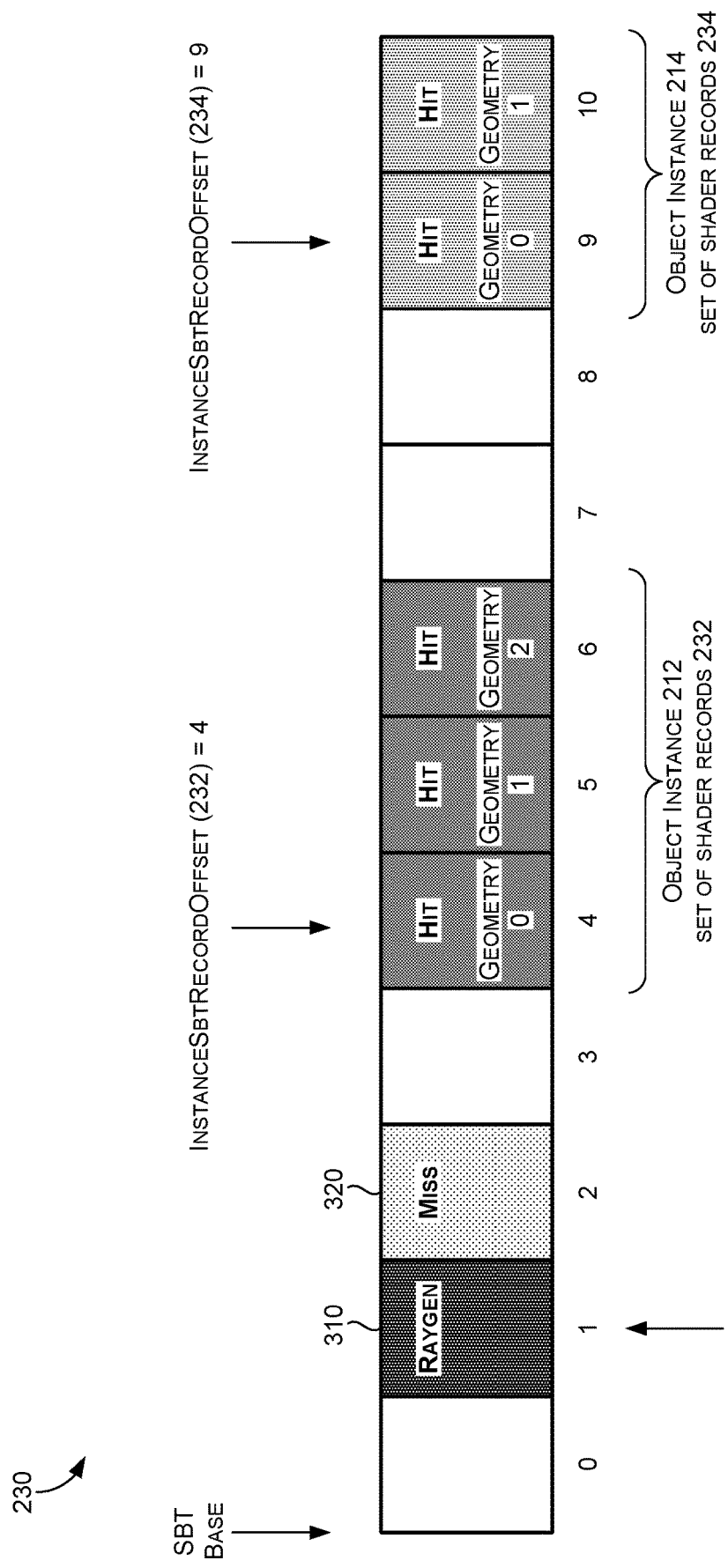
FIG. 3A is a diagram illustrating an example of a shader binding table arranged based at least in part by object instance and sub-geometry, which may be used to determine a shader record, in accordance with some embodiments of the present disclosure.
Figure 3B:
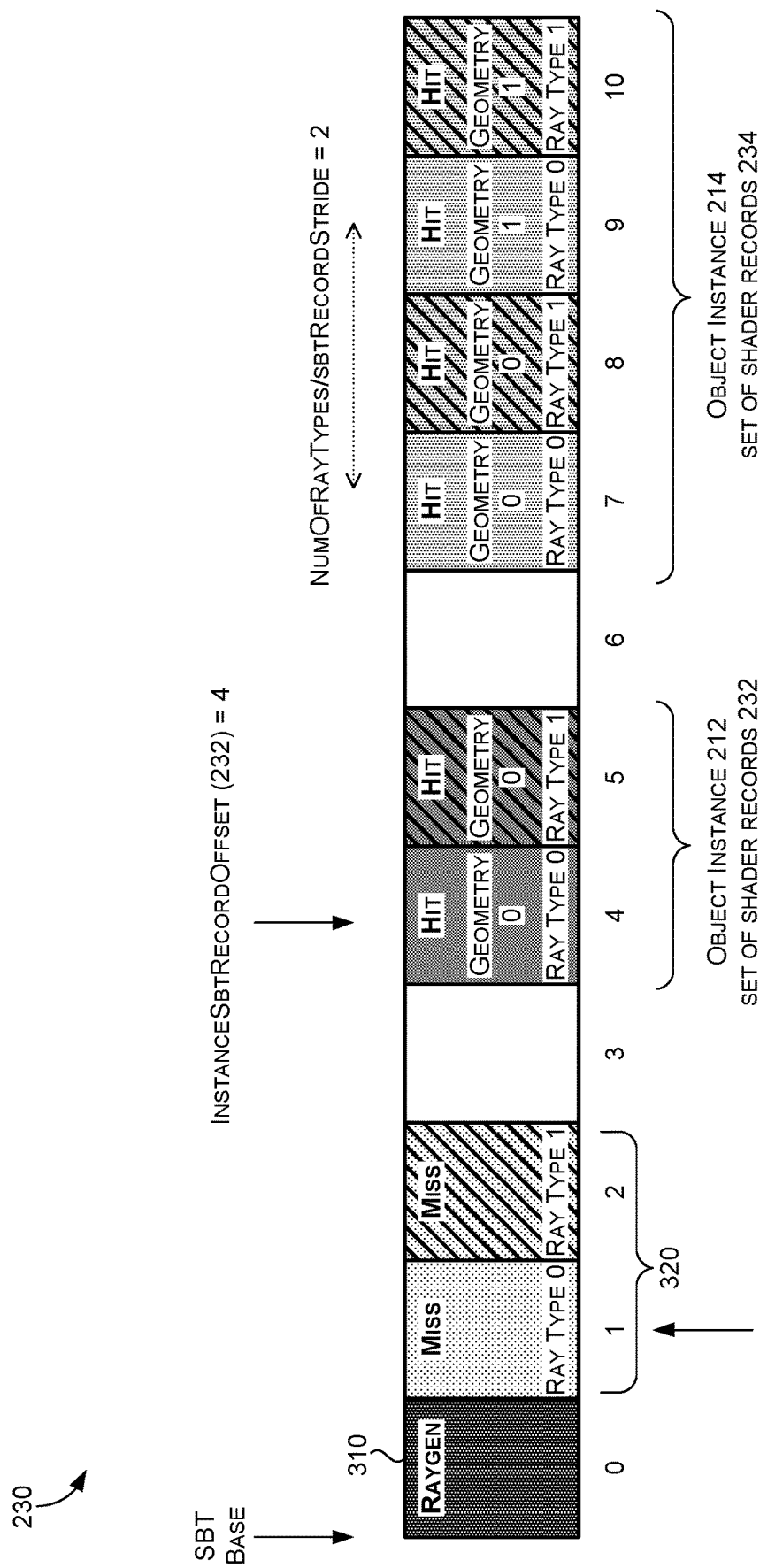
FIG. 3B is a diagram illustrating an example of a shader binding table with sets of shader records having sections indexed by sub-geometry, which may be used to determine a shader record, in accordance with some embodiments of the present disclosure.
Figure 3C:
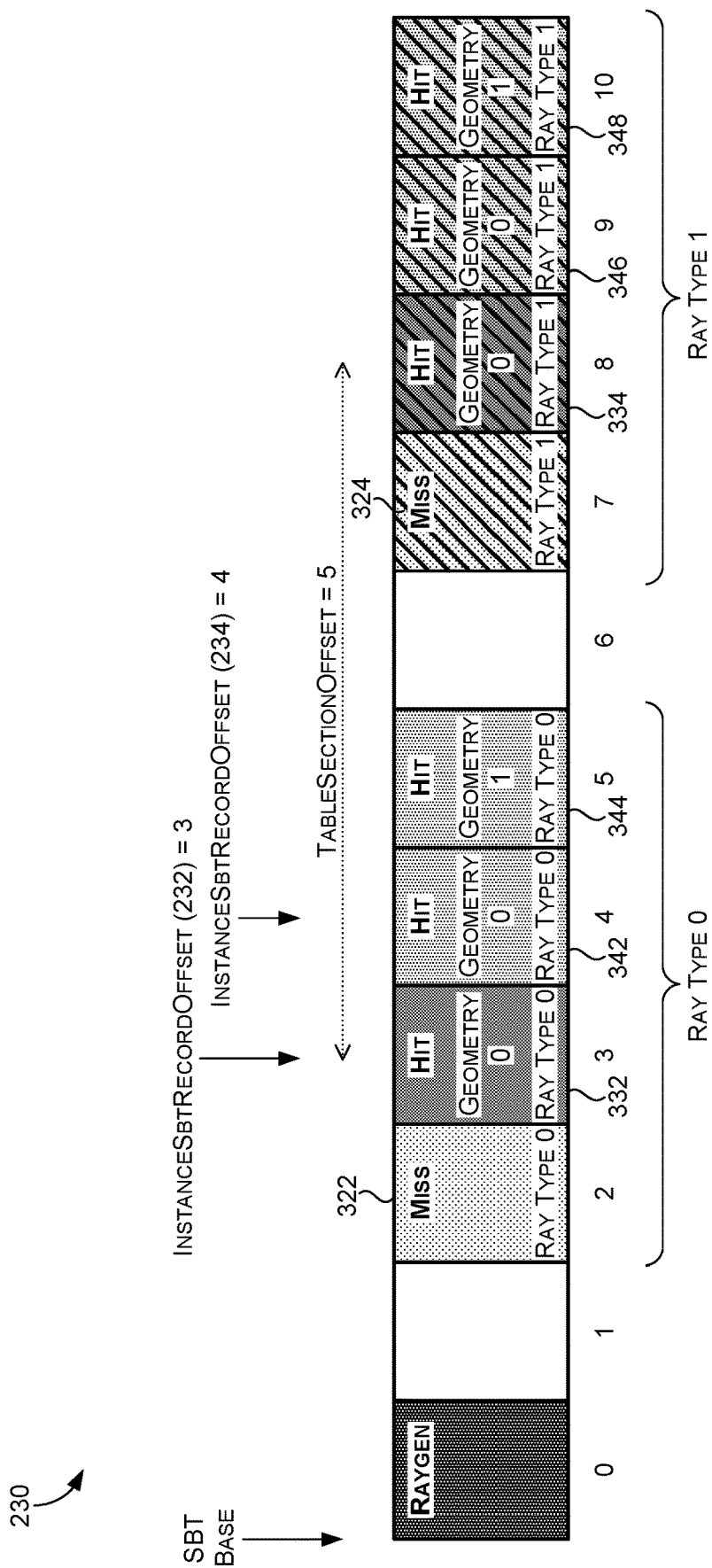
FIG. 3C is a diagram illustrating an example of a shader binding table with sets of shader records having sections indexed by ray type, which may be used to determine a shader record, in accordance with some embodiments of the present disclosure.

Further examples of how the shader records may be arranged and how the shader record determiner 126 may the compute locations of shader records are described with respect to FIGS. 3A-3C. The image renderer 128 may use the location of a shader record to access the shader record's data, including the program identifier, such as the program identifier 252 of FIG. 2B, and the associated resource table, such as the resource table 254 of FIG. 2B. The image rendered 128 may then execute the applicable shader(s) identified by the program identifier using the resource(s) defined in the resource table to render the 3D scene. Where an API is employed, in some examples, the application may have previously used the scene manager 112 to previously register the shaders with the API, resulting in particular program identifiers being associated with particular shaders. For example, the API may maintain an internal data structure that records the associations between the program identifiers and shaders. Where the API executes a shader(s) using a program identifier, it may access these records to determine which shader(s) to run.

It should be noted that the components of the scene management and rendering system 100 may be implemented as discrete or distributed components or in conjunction with other components, and in any suitable combination and location. In one example, the components of the scene management and rendering system 100 may reside in and/or be implemented by a CPU(s), such as a CPU(s) 806 of FIG. 8. The CPU(s) may execute an application, such as one belonging to an application developer. In some examples, the application may be running on a CPU(s), such as the CPU(s) 806 of FIG. 8 and may implement each of the components of the scene management and rendering system 100. Examples of suitable applications include video games, 3D scene editors, 3D movie editing applications, client applications, and/or other applications that may generate, display, and/or use renderings of 3D scenes. In other examples, the components of the scene management and rendering system 100 may reside in and/or be implemented by a GPU(s), such as a GPU(s) 808 of FIG. 8. The GPU(s) may execute one or more programs or services that belong to an API.

Figure 8:
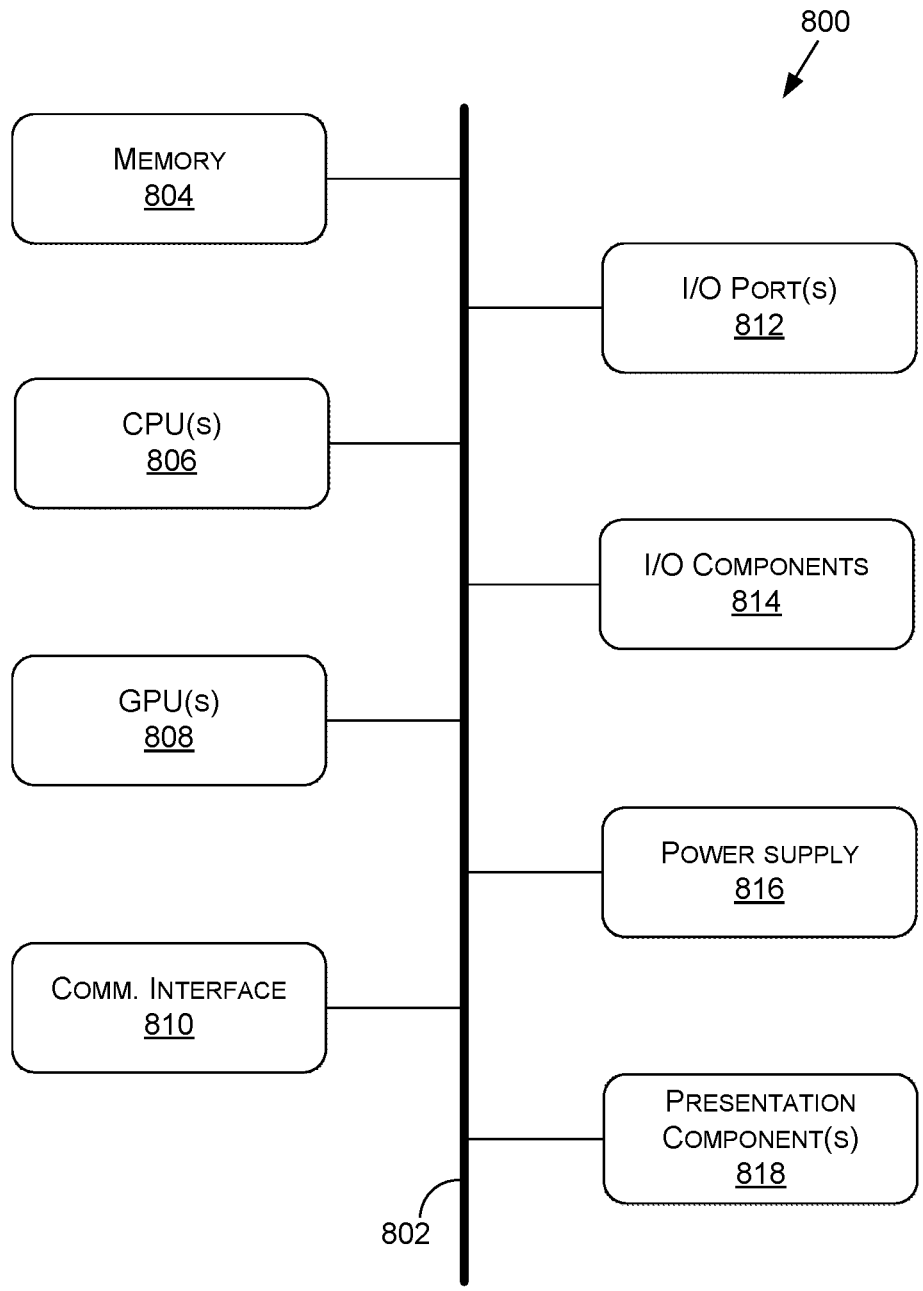
FIG. 8 is a block diagram of an example computing device suitable for use in implementing some embodiments of the present disclosure.

In some examples, some components of the scene management and rendering system 100 may reside in or be implemented by a CPU(s), such as the CPU(s) 806 of FIG. 8, while other components may reside in and/or be implemented by a GPU(s), such as the GPU(s) 808 of FIG. 8. For example, the scene manager 112, the shader configurer 114 and/or the shader location determiner 116 may be implemented by one or more applications executing on a CPU while the image renderer 128, the ray tracer 122, and/or the shader record determiner 126 may be implemented by one or more programs or services of an API executing on a GPU. In such examples, a bus 802 of FIG. 8 may be used to exchange information between the application(s) and the API, such as by way of API calls (e.g., to initiate ray tracing queries, etc.). Further, the application may use the bus 802 or a different bus 802 to transfer shader records and/or object instance records to and from GPU memory (e.g., from a hard drive and/or system memory).

The application may generate and maintain one or more versions of shader binding tables, such as the shader binding table 230, and allocate GPU memory to store the shader binding table(s). This may be accomplished by the application using API calls to one or more APIs, such as an API that allows direct memory access to one or more hardware components of the computing device 800 (e.g., provided by the operating system). This may allow the application(s) to update the shader binding table(s) and/or object instances in memory without using calls to the ray tracing API that executes the shaders.

Referring now to FIGS. 3A-3C, FIGS. 3A-3C illustrate further examples of how the shader records may be arranged in the shader binding table 230 using the shader location determiner 116 and how the shader record determiner 126 may compute the locations of shader records within the shader binding table 230. It is noted that the calculations of locations of shader records may vary depending upon how the shader binding table 230 and/or sets of shader records are arranged or indexed. For example, different types of offset values other than index values may be used in the computations in addition to, or instead of index values.

FIG. 3A is a diagram illustrating an example of the shader binding table 230 arranged based at least in part by object instance and sub-geometry, which may be used to determine a shader record, in accordance with some embodiments of the present disclosure. In the example of FIG. 3A, the shader binding table 230 may include shader records for three types of shaders: ray generation shaders, miss shaders, and hit shaders. In some examples, each miss shader record in the shader binding table 230 may be of the same or approximately the same size in memory. Similarly, each hit shader record in the shader binding table 230 may be of the same or approximately the same size in memory. Also in some examples, each hit shader record may be of the same or approximately the same size in memory. In various examples, all shader records in the shader binding table 230 may be of the same or approximately the same size in memory. Alternatively, shader records can be of different sizes depending on the embodiment.

The ray generation shaders, miss shaders, and/or hit shaders may be arranged into one or more sets of shader records, each of which may be identified and located by a location identifier, as described herein. For example, one set of shader records may include a ray generation shader record 310. Another set of shader records may include a miss shader record 320. The set of shader records 232 may include three hit shader records and the set of shader records 234 may include two shader records. Any number of shader records may be included in different sets of shader records.

In the present example, the sets of shader records are arranged by shader type, and further arranged by object instance and sub-geometry by way of example. The location identifier for the set of shader records (e.g., a single record) including the ray generation shader record 310 in the shader binding table 230 may be a global constant value. For example, its location may be defined by an index of the shader binding table 230. In the example shown, the location identifier for the ray generation shader record 310 may be defined as RayGenProgramIndex=1 in FIG. 3A. To compute the location for the ray generation shader record 310, the index value of 1 may be added to the index value of 0 that defines the beginning of the shader binding table 230. Assuming that each shader record is the same size, the memory address of the ray generation shader record 310 may then be computed by multiplying the record size by the sum of the two index values and offsetting the SBT base memory address by the resultant value.

Similarly, the location identifier for the set of shader records (e.g., a single record) including the miss shader record 320 in the shader binding table 230 may be a global constant value. For example, its location may also be defined by an index of the shader binding table 230. In the example shown, the location identifier for the miss shader record 320 may be defined as MissProgramSbtBaseIndex=2 in FIG. 3A. To compute the location for the miss shader record 320, the index value of 2 may be added to the index value of 0 that defines the beginning of the shader binding table 230. Assuming that each shader record is the same size, the memory address of the ray generation shader record 310 may then be computed by multiplying the record size by the sum of the two index values and offsetting the SBT base memory address by the resultant value.

Also in the present example, hit shader records are further arranged into sets of records by object instance. For example, the location identifier for the set of shader records 232 including the miss shader record 320 in the shader binding table 230 may be stored in the object instance record of the object instance 212. In the example shown, the location identifier for the set of shader records 232 may be defined as InstanceSBTRecordOffset=4 in FIG. 3A. To compute the location for the first shader record in the set of shader records 232, the index value of 4 may be added to the index value of 0 that defines the beginning of the shader binding table 230. Assuming that each shader record is the same size, the memory address of the first shader record may then be computed by multiplying the record size by the sum of the two index values and offsetting the SBT base memory address by the resultant value. As the set of shader records 232 are further arranged by sub-geometry, to compute the location of a shader record for a given sub-geometry N in the set of shader records 232, the index value of 4 may be added to the index value, or offset value, GeometryIdx of the sub-geometry N within the set of shader records 232 and to the index value of 0 that defines the beginning of the shader binding table 230. For example, each sub-geometry may be indexed using GeometryIdx values from 0 to X-1 (e.g., defined with the object instance record), where X is the number of sub-geometries in the set of shader records 232. The present example shows three sub-geometries with index values of 0 to 2. Assuming that each shader record is the same size, the memory address of the shader record may then be computed by multiplying the record size by the sum of the three index values and offsetting the SBT base memory address by the resultant value.

FIGS. 3B and 3C illustrate examples where sets of shader records have sections indexed by different arrangement criteria, which may be used to determine a shader record, in accordance with some embodiments of the present disclosure. For example, FIG. 3B is a diagram illustrating an example of a set of shader records that may be arranged based at least in part by object instance with sections indexed by sub-geometry. FIG. 3C is a diagram illustrating an example of how a set of shader records may be arranged based at least in part by sections indexed by ray type.

In the context of object instances, the approaches of FIGS. 3B and 3C may be used to structure the shader binding table 230 to support multiple shaders for each sub-geometry of an object instance based on ray types, geometry faces, and/or other arrangement criteria. Some examples of ray types include radiance rays or shadow rays. Radiance rays may be used to sample radiance values for pixels. Shadow rays, on the other hand, may be used to sample opacity values for transparent shadows. Using the approaches of FIGS. 3B and 3C, the shader binding table 230 may support dynamic selection of a shader record through computing the shader records location based on such criteria associated with a ray tracing query as which sub-geometry a ray intersected with and the ray type of the ray.

For each the approaches of both FIGS. 3B and 3C, a location identifier may be used to identify the location of the set of shader records. Within a set of shader records, the shader records may be further arranged into sections by potential values of arrangement criteria. For example, in FIG. 3B each section corresponds to a different sub-geometry that a ray may intersect with as a result of a ray tracing query, and each section includes a shader record for different potential ray types for the ray. For example, the set of shader records 234 includes two sections, one having two shader records for the sub-geometry having a GeometryIdx of 0, and another section having two shader records for the sub-geometry having a GeometryIdx of 1. According to some embodiments, each sub-geometry section of a set of shader records for an object instance may include at most the number of shader records as potential ray types (e.g., one for each ray type). However, in other examples a section may include any number of shader records, such as where the section includes one or more sub-sections indexed by additional criteria.

Using the approach of FIG. 3B, the shader record determiner 126 and the shader location determiner 116 may determine the location of a shader record in memory using the equation (1) below:

$$SbtIndex = InstanceSbtRecordOffset + (GeometryIdx * NumOfRayTypes) + RayTypeOffset \quad (1)$$

where SbtIndex may be an index or offset value to the location for the shader record relative to the location of the shader binding table 230 (e.g., the SBT base), InstanceSbtRecordOffset may be the index or offset value for the location in the memory of the set of shader records within the shader binding table 230, GeometryIdx may be the sub-geometry index number of a sub-geometry within the object instance and/or set of shader records, NumOfRayTypes may be the total number of ray types in the set of shader records, and RayTypeOffset may be the ray type index number of a ray type within the object instance and/or set of shader records. For example, for a ray tracing query, the RayTypeOffset may be set to the ray type of a ray traced in processing the ray tracing query and the GeometryIdx may be set to the sub-geometry, if any, that the ray intersected with. Further, the InstanceSbtRecordOffset may be set to the location identifier associated with the ray tracing query, such as of the object instance that includes the sub-geometry.

For example, according to the shader binding table 230 of FIG. 3B, the InstanceSbtRecordOffset for the object instance 212 may be the index value 4, and for the object instance 214, the index value 2. The GeometryIdx for the object instance 212 may be only be set to 0, which may indicate that the object instance 212 only includes one sub-geometry. In contrast, the GeometryIdx for the object instance 214 may be 0 or 1, which may indicate the object instance 214 includes two sub-geometries. In either case, the NumOfRayTypes may be set to 2 (e.g., where there may be shadow rays or radiance rays). Further, the RayTypeOffset may be 0 or 1 depending on the type of ray traced using a ray tracing query.

In the example of equation (1), (GeometryIdx*NumOfRayTypes) may be a section selector value that selects and locates a particular section from a set of sections in a set of shader records. For example, the section selector value may represent or correspond to a location (e.g., the memory location) of the section relative to the location of the set of shader records. NumOfRayTypes may be a stride value (an intra-section stride value) that defines the stride of each section to simplify the computation of the location of a shader record by assuming that each section in the set of records may be the same size in memory. However, in other examples, a different type of stride value(s) may be used, and the stride value could be different for different sections. For example, where the sections include at least one sub-section, one or more stride values for those sub-sections may be used. In various examples, the stride value may represent the number of potential or actual shader records included in or more sections of the set of shader records. As an example, if the sections of the set of shader records 232 instead each corresponds to a particular ray type, the section selector value could use the total number of sub-geometry indexes for the set of shader records in place of NumOfRayTypes and the RayTypeOffset in place of the GeometryIdx. The GeometryIdx may then be used to select a shader record within the section in place of the RayTypeOffset. Other variations are possible to account for other arrangements and arrangement criteria.

Equation (1) may also be used to compute the location of a shader record for a missed ray by setting GeometryIdx to 0 and using MissProgramBaseIndex as the InstanceSbtRecordOffset. In the computations described herein, such as the equations to compute SbtIndex, values of the variables may be stored with limited precision to reduce storage requirements.

Referring now to FIG. 3C, FIG. 3C may be similar to FIG. 3B except that the sections for a set of shader records are arranged by ray type and a section of the set of shader records may be interleaved with at least a section of a different set of shader records. However, the interleaving approach may be applied to sections that correspond to any arrangement criteria, such as sub-geometry. The interleaving may allow for additional flexibility in arrangement shader records for a set of shader records. In FIG. 3C, the set of shader records 232 may include a first section having a shader record 332 and a second section having a shader record 334. The set of shader records 234 may include a first section having shader record 342 and 344 and a second section having shader record 346 and 348. A set of shader records for ray misses may include a first section having a shader record 322 and a second section having a shader record 324.

Using the approach of FIG. 3C, the shader record determiner 126 and the shader location determiner 116 may determine the location of a shader record in memory using the equation (2) below:

$$SbtIndex = InstanceSbtRecordOffset + GeometryIdx + (RayTypeOffset * TableSectionOffset)$$

where the TableSectionOffset represents the distance between sections of shader records within the set of shader records and the other variables may be similar to equation (1). In the example of equation (2), (RayTypeOffset*TableSectionOffset) may be a section selector value that selects and locates a particular section from a set of sections in a set of shader records. For example, the section selector value may represent or correspond to a location (e.g., the memory location) of the section relative to the location of the set of shader records. TableSectionOffset may be a stride value (an inter-section stride value) that defines the stride between each section to simplify the computation of the location of a shader record by assuming that each section in the set of records may be separated by the same distance in memory (e.g., the same number of shader records). However, in other examples, a different type of stride value(s) may be used, and the stride value could be different between different sections. For example, where the sections include at least one sub-section, one or more stride values for those sub-sections may be used. In various examples, the stride value may represent the number of potential or actual shader records included between or more sections of the set of shader records. It is noted that an inter-section stride value(s) may be used in combination with an intra-section stride value(s) to compute a shader record location in some examples. Other variations are possible to account for other arrangements and arrangement criteria.

Figure 4:
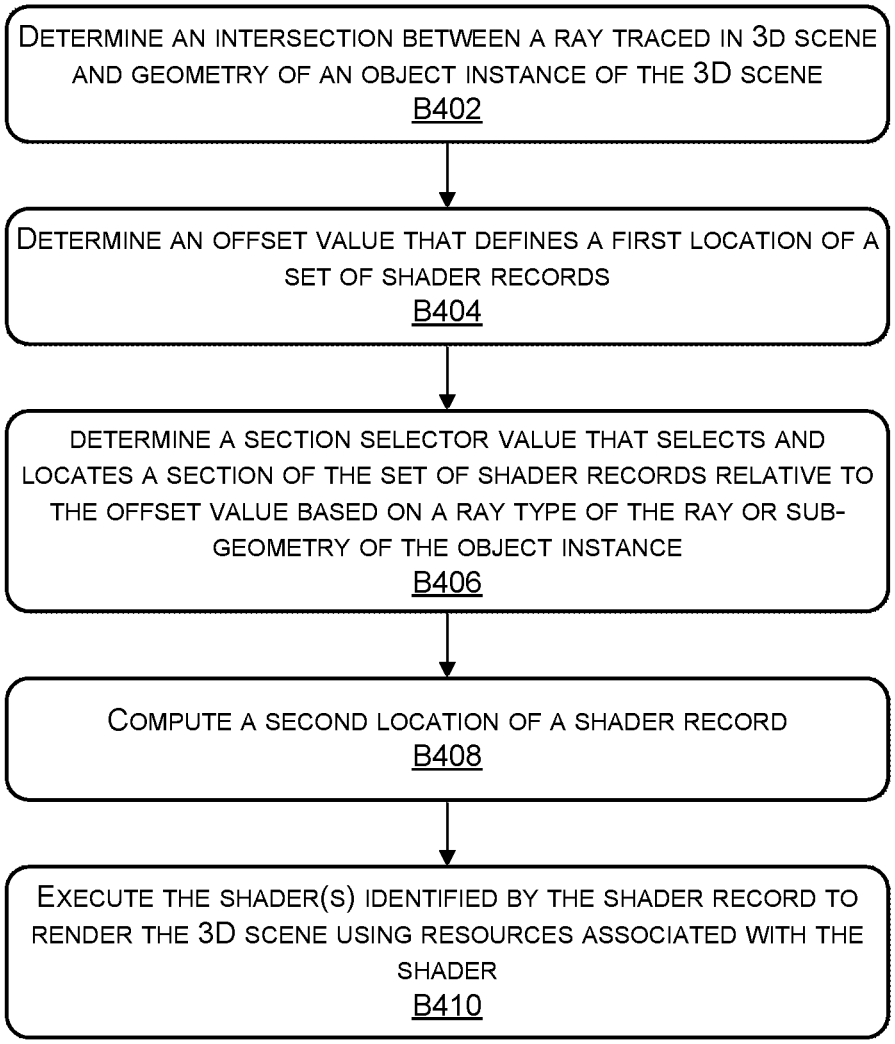
FIG. 4 is a flow diagram showing a method for using a shader binding table to render a 3D scene in which a ray intersects with geometry of the 3D scene, in accordance with some embodiments of the present disclosure.

FIG. 4 is a flow diagram showing the method 400 for using a shader binding table to render a 3D scene in which a ray intersects with geometry of the 3D scene, in accordance with some embodiments of the present disclosure. The method 400, may apply to the examples of any of the FIGS. 2A-2B, or 3A-3C, or other examples. The method 400, at block B402, includes determining an intersection between a ray traced in a 3D scene, and a geometry of an object instance of the 3D scene. For example, the ray tracer 122 of the scene management and rendering system 100 may receive a ray tracing query, process it, and determine that a ray intersects with geometry of an object instance (e.g., the object instance 212) in a 3D scene.

The method 400, at block B404, includes determining an offset value that defines a first location in a memory of a set of shader records within a shader binding table that correspond to the object instance intersected by the ray. For example, the shader record determiner 126 may determine an offset value to the set of shader records 232 associated with the object instance 212. The offset value may correspond to the location of the first shader record in the set of shader records 232 in the memory 220.

The method 400, at block B406, includes determining a selection selector value that selects a section of the set of shader records relative to the offset value based on a ray type or a sub-geometry of the object instance. For example, the shader record determiner 126 of the scene management and rendering system 100 may determine a section selector value that selects and locates a section of the set of shader records based on a ray type and/or a sub-geometry of the object instance that is associated with the ray tracing query.

The method 400, at block B408, includes computing a second location in the memory within the section based on the offset value and the section selector value. For example, the shader record determiner 126 may compute the memory address of the shader record to execute in response to the ray tracing query.

The method 400, at block B410, includes executing the shader(s) identified by the shader record to render at least a portion of the 3D scene using the set of resources associated with the shader. For example, the image renderer 128 may access the shader record 324 using the memory address to determine the shader and the resources and to execute the shader using the resources to render the 3D scene.

Figure 5:
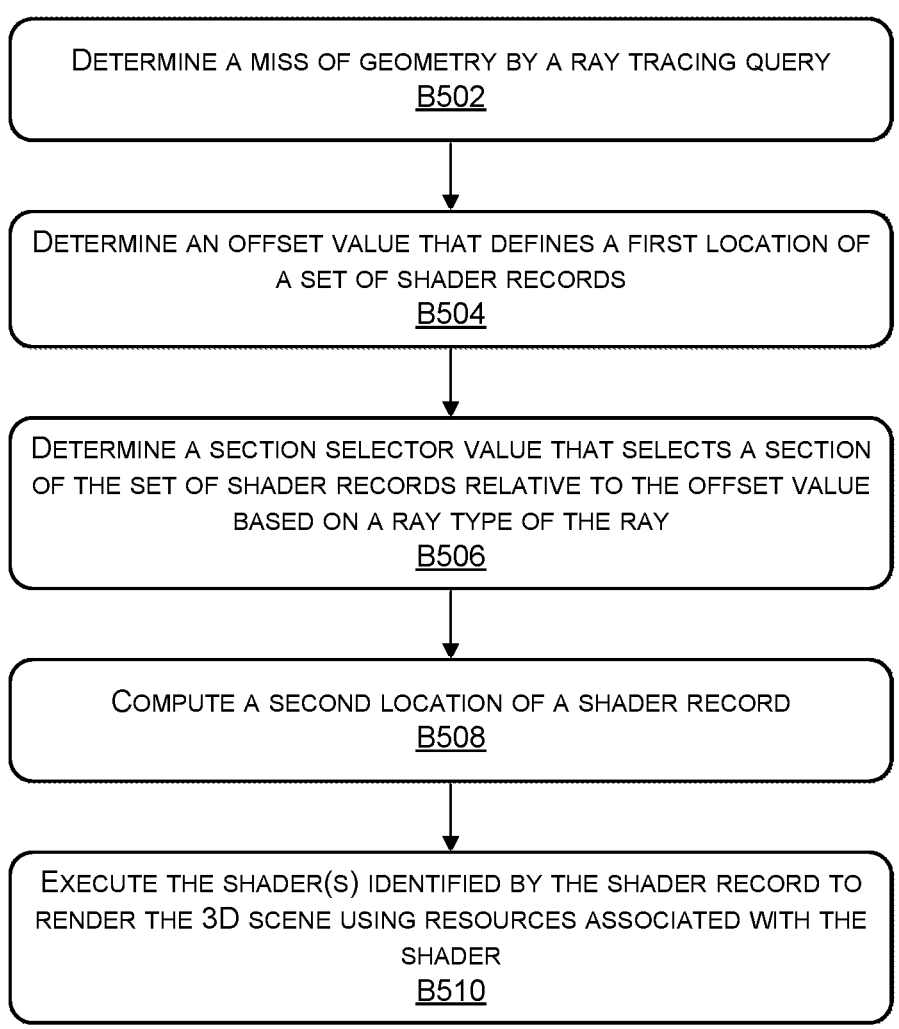
FIG. 5 is a flow diagram showing a method for using a shader binding table to render a 3D scene in which a ray misses geometry of the 3D scene, in accordance with some embodiments of the present disclosure.

FIG. 5 is a flow diagram showing an alternate method 500 for using a shader binding table to render a 3D scene in which a ray misses geometry of the 3D scene, in accordance with some embodiments of the present disclosure. The method 500, may apply to the examples of any of the FIGS. 2A-2B, or 3A-3C, or other examples. The method 500, at block B502, includes determining that a ray tracing query for an intersection between a ray and the geometry in a 3D scene resulted in a miss of the geometry. For example, the ray tracer 122 may determine that a ray did not hit any surfaces in a 3D scene as a result of the ray tracing query.

The method 500, at block B504, includes determining an offset value that defines a first location in memory of a set of shader records within a shader binding table that correspond to the miss of the geometry. For example, the shader record determiner 126 may determine an offset value to a set of shader records that includes the shader records 322 and 324 of FIG. 3C and is associated with the miss of the geometry. The offset value may be defined by a global constant value, such as MissSbtBaseIndex, to point to the shader record 322 in the memory 220.

The method 500, at block B506, includes determining a section selector value that selects a selection of the set of shader records relative to the offset value. For examples, the shader record determiner 126 may compute a section selector value that selects and locates the section of the set of shader records that includes the shader record 324.

The method 500, at block B508, includes computing a second location in the memory of a shader record within the section based on the offset value and the section selector value. For example, the shader record determiner 126 may compute the memory address for the shader record 324 in memory using equation (2).

The method 500, at block B510, includes executing the shader(s) identified by the shader record to render at least a portion of the 3D scene using the set of resources associated with the shader. For example, the image renderer 128 may access the shader record 324 using on the memory address to determine the shader and the resources and execute the shader using the resources to render the 3D scene.

Figure 6:
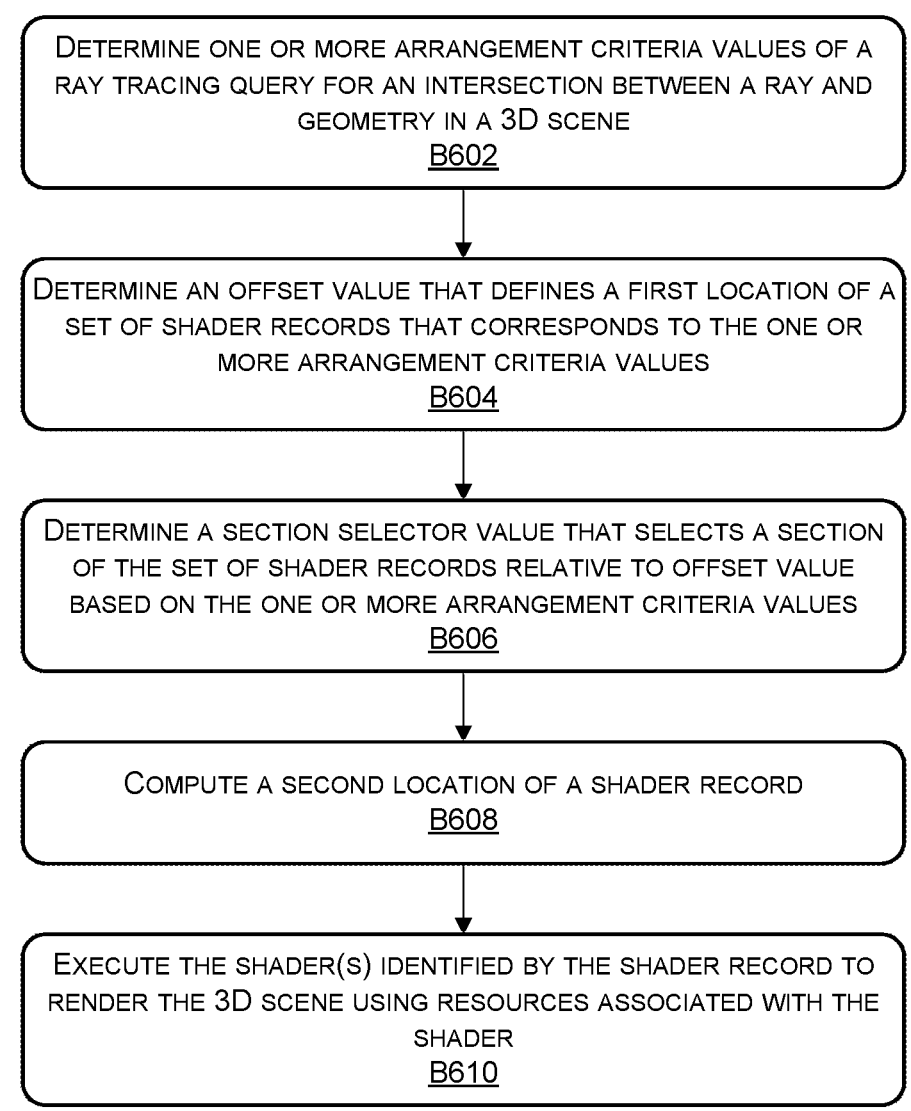
FIG. 6 is a flow diagram showing a method for using a shader binding table to render a 3D scene based at least in part on arrangement criteria values of a ray tracing query, in accordance with some embodiments of the present disclosure.

FIG. 6 is a flow diagram showing another alternative method 600 for using a shader binding table to render a 3D scene based at least in part on arrangement criteria values of a ray tracing query, in accordance with some embodiments of the present disclosure. The method 600 may apply to the examples of any of the FIGS. 2A-2B, or 3A-3C, or other examples. The method 600, at block B602, includes determining arrangement criteria values of a ray tracing query for an intersection between a ray and geometry in a 3D scene. For example, the ray tracer 122 may determine a hit of geometry with the ray, a miss of all geometry in the 3D scene, or another result. Where an intersection occurs, the arrangement criteria values may further include the object instance that was hit, the sub-geometry of the object instance, the surface that was hit, and/or values for other arrangement criteria.

The method 600, at block B604, includes determining an offset value that defines a first location of a set of shader records that corresponds to the arrangement criteria values of the ray tracing query. For example, the shader record determiner 126 may determine an offset value to the set of shader records 232 using the arrangement criteria values associated with the object instance 212, if an intersection of geometry and ray is found.

The method 600, at block B606, includes determining a section selector value that defines a selection and location of a section of the set of shader records relative to the offset value based on the result of the ray tracing query. For example, the shader record determiner 126 may determine a section selector value corresponding to a section of the set of shader records 232 in FIG. 3B.

The method 600, at block B608, includes computing a second location of the shader records in the memory within the section based on the offset value and the section selector value. For example, the shader record determiner 126 may compute the location of the shader record to execute using equation (1).

The method 600, at block B610, includes executing the shader(s) identified by the shader record to render at least a portion of the 3D scene using the set of resources associated with the shader. For example, the image renderer 128 may access the shader record 324 using on the memory address to determine the shader and the resources and execute the shader using the resources to render the 3D scene.

Figure 7:
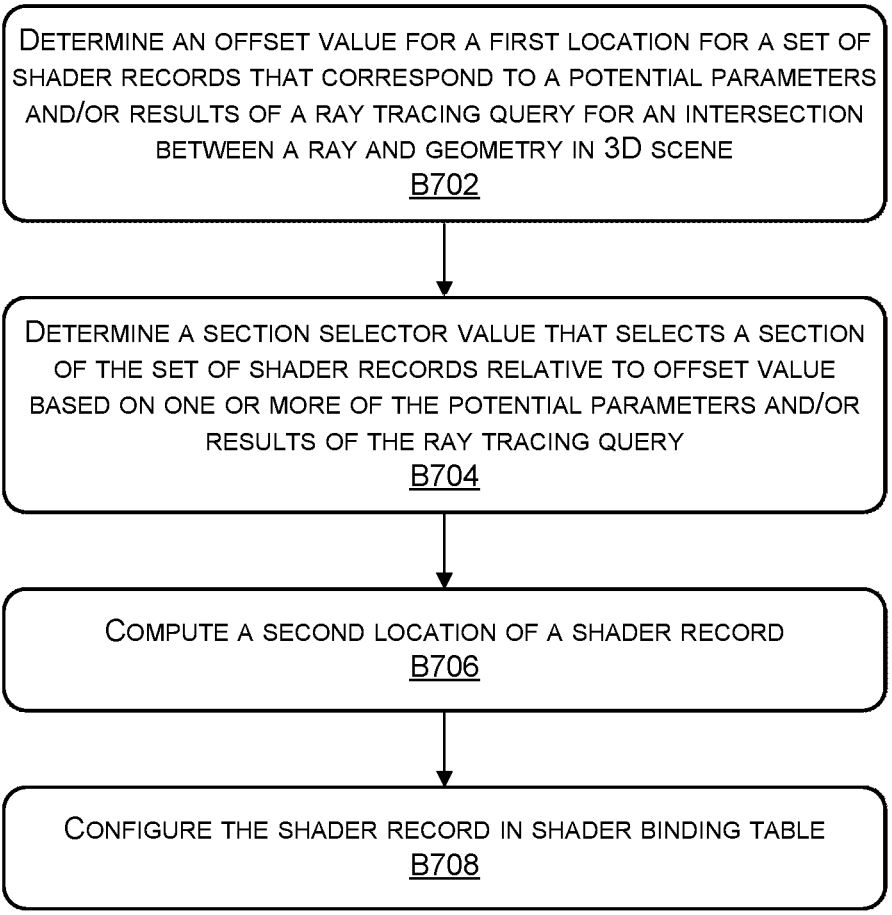
FIG. 7 is a flow diagram showing a method for configuring a shader record in a shader binding table to render a 3D scene, in accordance with some embodiments of the present disclosure.

FIG. 7 is a flow diagram showing a method 700 for configuring a shader record in a shader binding table to render a 3D scene, in accordance with some embodiments of the present disclosure. The method 700, may apply to the examples of any of the FIGS. 2A-2B, or 3A-3C, or other examples. The method 700, at block B702, includes determining an offset value that defines a first location in a memory for a set of shader records in a shader binding table that corresponds to potential parameters and/or results of a ray tracing query. For example, the shader location determiner 116 may determine an offset value and/or location identifier that corresponds to a first location for a set of shader records in the shader binding table 230.

The method 700, at block 704, includes determining a section selector value that selects a section of the set of shader binding records relative to the offset value. For example, the shader location determiner 116 may determine a section selector value that using arrangement criteria values that represent one or more of the parameters and/or potential results.

The method 700, at block 706, includes computing a second location of a shader record of the set of shader records within the section based on the offset value and the section selector value. For example, the shader location determiner 116 may compute the location of the shader record that should be executed when a ray tracing query has the one or more of the parameters and/or potential results.

The method 700, at block 708, including configuring the shader record in the shader binding table. For example, the shader configurer 114 may configure the shader record 250 in memory using the second location.

FIG. 8 is a block diagram of an example computing device 800 suitable for use in implementing some embodiments of the present disclosure. Computing device 800 may include a bus 802 that directly or indirectly couples the following devices: memory 804, one or more central processing units (CPUs) 806, one or more graphics processing units (GPUs) 808, a communication interface 810, input/output (I/O) ports 812, input/output components 814, a power supply 816, and one or more presentation components 818 (e.g., display(s)).

Although the various blocks of FIG. 8 are shown as connected via the bus 802 with lines, this is not intended to be limiting and is for clarity only. For example, in some embodiments, a presentation component 818, such as a display device, may be considered an I/O component 814 (e.g., if the display is a touch screen). As another example, the CPUs 806 and/or GPUs 808 may include memory (e.g., the memory 804 may be representative of a storage device in addition to the memory of the GPUs 808, the CPUs 806, and/or other components). In other words, the computing device of FIG. 8 is merely illustrative. Distinction is not made between such categories as "workstation," "server," "laptop," "desktop," "tablet," "client device," "mobile device," "handheld device," "game console," "electronic control unit (ECU)," "virtual reality system," and/or other device or system types, as all are contemplated within the scope of the computing device of FIG. 8.

The bus 802 may represent one or more busses, such as an address bus, a data bus, a control bus, or a combination thereof. The bus 802 may include one or more bus types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus.

The memory 804 may include any of a variety of computer-readable media. The computer-readable media may be any available media that may be accessed by the computing device 800. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 804 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 800. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 806 may be configured to execute the computer-readable instructions to control one or more components of the computing device 800 to perform one or more of the methods and/or processes described herein. The CPU(s) 806 may each include one or more cores (e.g., one, two, four, eight, twenty-eight, seventy-two, etc.) that are capable of handling a multitude of software threads simultaneously. The CPU(s) 806 may include any type of processor, and may include different types of processors depending on the type of computing device 800 implemented (e.g., processors with fewer cores for mobile devices and processors with more cores for servers). For example, depending on the type of computing device 800, the processor may be an Advanced RISC Machines (ARM) processor implemented using Reduced Instruction Set Computing (RISC) or an x86 processor implemented using Complex Instruction Set Computing (CISC). The computing device 800 may include one or more CPUs 806 in addition to one or more microprocessors or supplementary co-processors, such as math co-processors.

The GPU(s) 808 may be used by the computing device 800 to render graphics (e.g., 3D graphics). The GPU(s) 808 may include hundreds or thousands of cores that are capable of handling hundreds or thousands of software threads simultaneously. The GPU(s) 808 may generate pixel data for output images in response to rendering commands (e.g., rendering commands from the CPU(s) 806 received via a host interface). The GPU(s) 808 may include graphics memory, such as display memory, for storing pixel data. The display memory may be included as part of the memory 804. The GPU(s) 808 may include two or more GPUs operating in parallel (e.g., via a link). When combined together, each GPU 808 may generate pixel data for different portions of an output image or for different output images (e.g., a first GPU for a first image and a second GPU for a second image). Each GPU may include its own memory, or may share memory with other GPUs.

The communication interface 810 may include one or more receivers, transmitters, and/or transceivers that enable the computing device 800 to communicate with other computing devices via an electronic communication network, included wired and/or wireless communications. The communication interface 810 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet), low-power wide-area networks (e.g., LoRaWAN, SigFox, etc.), and/or the Internet.

The I/O ports 812 may enable the computing device 800 to be logically coupled to other devices including the I/O components 814, the presentation component(s) 818, and/or other components, some of which may be built in to (e.g., integrated in) the computing device 800. Illustrative I/O components 814 include a microphone, mouse, keyboard, joystick, game pad, game controller, satellite dish, scanner, printer, wireless device, etc. The I/O components 814 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 800. The computing device 800 may be include depth cameras, such as stereoscopic camera systems, infrared camera systems, RGB camera systems, touchscreen technology, and combinations of these, for gesture detection and recognition. Additionally, the computing device 800 may include accelerometers or gyroscopes (e.g., as part of an inertia measurement unit (IMU)) that enable detection of motion. In some examples, the output of the accelerometers or gyroscopes may be used by the computing device 800 to render immersive augmented reality or virtual reality.

The power supply 816 may include a hard-wired power supply, a battery power supply, or a combination thereof. The power supply 816 may provide power to the computing device 800 to enable the components of the computing device 800 to operate.

The presentation component(s) 818 may include a display (e.g., a monitor, a touch screen, a television screen, a heads-up-display (HUD), other display types, or a combination thereof), speakers, and/or other presentation components. The presentation component(s) 818 may receive data from other components (e.g., the GPU(s) 808, the CPU(s) 806, etc.), and output the data (e.g., as an image, video, sound, etc.).

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including handheld devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method comprising:
   determining, in a three-dimensional (3D) scene, an intersection between a ray traced virtual ray and geometry of an object instance of the 3D scene;
   determining, based on the intersection, an offset value that defines a first location in a memory, the first location corresponding to one or more shader records of a shader binding table that corresponds to the object instance, each shader record including an identifier of at least one shader, associating a set of resources with the at least one shader, and capturing one or more criteria associated with the intersection that when satisfied binds the at least one shader to the object instance, wherein the one or more criteria defines a location of the shader record in the shader binding table;
   determining, based at least in part on at least one criteria of the one or more criteria associated with the intersection being satisfied for a selected shader record of the one or more shader records, a section selector value that selects a section of shader records in the shader binding table;
   computing a second location in the memory, the second location corresponding to the selected shader record within the section based at least in part on the offset value and the section selector value;
   accessing the selected shader record at the second location in the memory to determine the set of resources and the at least one shader associated with the selected shader record; and
   executing the at least one shader of the selected shader record to render at least a portion of the 3D scene using the set of resources associated with the at least one shader.

2. The method of claim 1, wherein the at least one criteria comprises at least a sub-geometry of the 3D scene hit by the ray, and wherein the section represents the sub-geometry of the object instance.

3. The method of claim 1, wherein the at least one criteria comprises at least a ray type of the ray traced virtual ray, and wherein the section represents the ray type of the ray traced virtual ray.

4. The method of claim 1, wherein the section of shader records that corresponds to the object instance is interleaved with a different section of shader records in the shader binding table that corresponds to a different object instance of the 3D scene.

5. The method of claim 1, wherein the location is a memory address and the memory address is different for each shader record of a plurality of the one or more shader records based at least on differences in the one or more criteria that are satisfied for corresponding ones of the plurality of the one or more shader records.

6. The method of claim 1, wherein the section of shader records comprises a first section of shader records of a set of sections of shader records, each section of the set of sections of shader records corresponding to the same object instance, further wherein the section selector value is determined based at least in part on a distance in memory between the first section of shader records and another section of shader records of the set of sections of shader records corresponding to the same object instance.

7. The method of claim 1, wherein the section selector value is based at least in part on a sub-geometry of the object instance and a total number of ray types used to index the one or more shader records within the shader binding table.

8. The method of claim 1, wherein the determination of the intersection between the virtual ray and the geometry of the object instance is in response to a ray tracing query received from an application via an Application Programming Interface (API) call.

9. The method of claim 1, wherein the identifier is a program identifier identifying the at least one shader and each shader record further includes a resource table including the set of resources associated with the at least one shader.

10. The method of claim 1, wherein the section selector value is computed using an inter-section stride value that defines a distance between each section of a plurality of sections of shader records that correspond to the same object instance.

11. The method of claim 1, wherein the section selector value is computed using an intra-section stride value that defines a size of each section of a plurality of sections of shader records that correspond to the same object instance.

12. A method comprising:
   determining that a ray tracing query for an intersection between a ray in a three-dimensional (3D) scene and geometry in the 3D scene resulted in a miss of the geometry;
   determining an offset value that defines a first location in a memory of a set of shader records within a shader binding table that corresponds to the miss of the geometry, each shader record including an identifier of at least one shader, associating a set of resources with the at least one shader, and capturing one or more criteria associated with the ray tracing query that when satisfied binds the at least one shader to a result of the ray tracing query, wherein the one or more criteria defines a location of the shader record in the shader binding table;
   determining, based at least of in part on the ray type of the ray satisfying at least one criteria of the one or more criteria associated with the ray tracing query for a selected shader record the set of shader records, a section selector value that selects a section of the set of shader records relative to the offset value;
   computing a second location in the memory of the selected shader record within the section based at least in part on the offset value and the section selector value; and executing the at least one shader of the selected shader record to render at least a portion of the 3D scene using the set of resources associated with the at least one shader based at least in part on accessing the shader record using the second location in the memory.

13. The method of claim 12, wherein each of the shader records of the set of shader records are a same size in the memory and the section selector value is an index value of a shader record of the section.

14. The method of claim 12, where the ray type is a radiance ray or a shadow ray.

15. The method of claim 12, wherein the offset value is a global constant value.

16. The method of claim 12, wherein each shader identified by the set of shader records is a miss shader.

17. A method comprising:
determining an offset value that defines a first location in a memory for a set of shader records in a shader binding table that corresponds to a potential result of a ray tracing query for an intersection between a ray in a three-dimensional (3D) scene and geometry in the 3D scene, each shader record including an identifier of at least one shader, associating a set of resources with the at least one shader, and capturing one or more criteria associated with the ray tracing query that when satisfied binds the at least one shader to the potential result of the ray tracing query, wherein the one or more criteria defines a location of the shader record in the shader binding table;

determining, based at least in part on the potential result of the ray tracing query satisfying at least one criteria of the one or more criteria associated with the ray tracing query for a selected shader record the set of shader records, a section selector value that selects a section of shader records in the shader binding table, a section selector value that selects a section of the set of shader records relative to the offset value;

computing a second location in the memory for the selected shader record of the set of shader records within the section based at least in part on the offset value and the section selector value; and configuring the selected shader record in the shader binding table based at least in part on the second location in the memory.

18. The method of claim 17, wherein the configuring of the selected shader record in the shader binding table includes storing the selected shader record at the second location or modifying the selected shader record stored at the second location.

19. The method of claim 17, wherein the potential result corresponds to the ray hitting a sub-geometry of an object instance and the section selector value is based at least in part on the sub-geometry.

20. The method of claim 17, wherein the configuring of the selected shader record in the shader binding table is performed by an application and the shader binding table is stored in a Graphics Processing Unit (GPU) memory.

* * * * *